Figure 2:
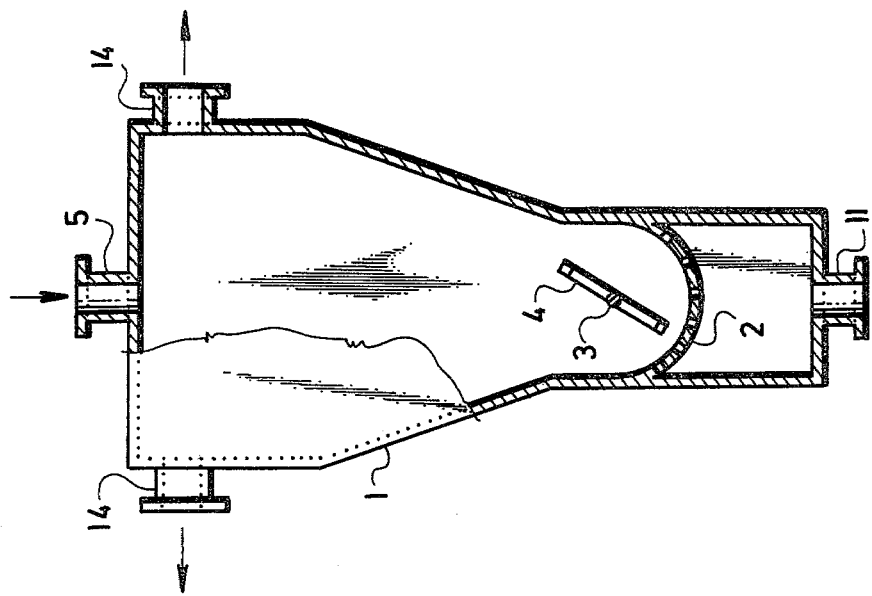

United States Patent [19]

Majer et al.

[11] 4,306,815
[45] Dec. 22, 1981

[54] APPARATUS FOR PROCESSING MATERIALS WHICH ARE DIFFICULT TO EXPAND WITH GAS AND/OR LIQUID, IN AN EXPANDED LAYER

[75] Inventors: Jaroslav Majer, Bratislava; Miloslav Petrácek, Brno, both of Czechoslovakia

[73] Assignee: Urad predsednictva Slovenskej akademie ved, Bratislava, Czechoslovakia

[21] Appl. No.: 56,847

[22] Filed: Jul. 12, 1979

[51] Int. Cl.³ .............................................. B01F 15/06
[52] U.S. Cl. ...................................... 366/147; 34/28; 34/57 D; 99/470; 99/483; 99/516; 366/102; 366/325
[58] Field of Search .............................. 366/101–103, 366/107, 106, 325, 603, 144, 145, 148, 149, 279, 325, 147; 99/483, 470, 475, 516, 517; 34/57 D, 28

[56] References Cited

U.S. PATENT DOCUMENTS

| 332,774 | 12/1885 | Andersen | 366/102 |
| 1,323,681 | 12/1919 | Day | 366/102 |
| 3,897,723 | 8/1975 | Lucy, Jr. et al. | 366/102 |

FOREIGN PATENT DOCUMENTS 710306  6/1954  United Kingdom ............... 366/102

Primary Examiner—Philip R. Coe
Assistant Examiner—Timothy F. Simone
Attorney, Agent, or Firm—Burgess, Ryan and Wayne

[57] ABSTRACT

Fluid bed processing of products not having suitable properties for fluidization, where gas expansion is not successful. The combined influence of gas expansion and mechanical mixing in the geometry of a horizontally located cylindrical grate enables more economical treating and use of lower gas velocity. The close control of particle residence time gives high quality of final products and extremely homogeneous results. The concentration of more processes into one apparatus is the further advantage of the invention.

4 Claims, 2 Drawing Figures

APPARATUS FOR PROCESSING MATERIALS WHICH ARE DIFFICULT TO EXPAND WITH GAS AND/OR LIQUID, IN AN EXPANDED LAYER

This invention relates to a method of processing solid, solute, dispersed, or semiplastic compounds and, above all, those difficult to expand with gas and/or liquid, in an expanded layer, and to an apparatus for the realization of said method. The particles of processed compounds are put in motion by the combined action of a gas and/or liquid medium and by agitation.

In the methods, known hitherto, for processing compounds in an expanded, especially fluidized layer, the particles are put in free motion by a current of an expanded medium only, the latter being, on principle, fed into the processed compound at a fluidization rate, that is, a rate sufficient to fluidize the solid particles. This technique often uses a liquid and/or a gas mixture as the expansion medium. In some cases, media of varying physical properties (temperature, pressure, humidity, and the like) and/or chemical properties (oxidizing atmosphere, reduction atmosphere, and the like) are used gradually in the course of processing. The application of a fluidization medium itself may be sufficient in a great number of uses to create a sufficient and well working expanded layer and to add to the good course of the process.

The respective devices used for the fluidization processes are uniquely designed to correspond with the methods being practiced. Mostly, they are made of vertical casings widening upwardly and divided by means of flat grates into a working compartment and a lower portion used for the intake of expansion and workable media, this portion being divided, in some cases, into separate chambers used for the isolated intake of media showing different physical parameters, and/or different chemical properties for the successive processing of the fluidized compound.

An apparatus is also known, created by a horizontally situated cylindrical casing, secured by grates in the lower and upper opposite portions and provided inside with rotary field blades dividing the working space of the casing into separate compartments. The blades are adapted also for conveying the processed compound in the working direction as far as the outlet branch. Under the lower portion of the cylindrical casing there are separated chambers serving for the individual intake of fluidizing and working media of dissimilar properties; and analogous system of chambers is arranged above the cylindrical casing upper grate, serving as outlets of the fluidizing medium and the products of reaction.

All the prior art devices are provided with corresponding inlets in the upper and lower portions serving for feeding the compounds to be processed and the fluidizing and working media, and outlets for the discharge of the fluidizing and working media after the operation has been finished, and/or for the withdrawal of the reaction products and the removal of finished products, as well. Branches for the supply of the processed compounds are located on the front walls of the plants.

The above described methods and the corresponding devices show a common drawback based on the fact that they do not enable the processing of those compounds whose specific physical properties and/or special shape particles, e.g. needle-shaped crystals, limit the possibility of application of the technology with a fluidized layer.

In such cases it is necessary to overcome the layer mechanical resistance coming into being in the way of bonding the individual particles. This may be attained by achieving a velocity of the gas current only which causes the following process to have the characteristics of pneumatic conveying. A typical such material is chloramphenicol antibioticum which resists almost all fluidized layers with free motion of particles when trying to dehydrate it by using a fluid technology. This technology has been used to advantage in the dehydration of other materials by taking advantage of the large specific surface, of the thorough contact between the gas and solid phases, to thereby achieve an effective heat and compound exchange, which makes it possible to use a low temperature in the fluidized layer and excludes any thermal decomposition of the product. It has not, heretofore, been possible to dehydrate chloramphenicol by fluid processes.

There are a lot of compounds of a similar character. However, even the compounds with otherwise suitable physical properties may be brought, e.g. at a high humidity rate, into a fluidized state only with great difficulty. Channeling, pistoning, and clotting occur, the material assuming a non-fluidizing configuration lying on the grate. Consequently, an uneven processing of the compound is manifested and it is not possible to exploit the energy of the fluidizing and working media, and more in a local overheating which may cause the contents of the apparatus to flame up as soon as the flash point has been attained, and the like.

From the standpoint of the plant design, in this respect the main disadvantages lie in the horizontal grate. The devices with cylindrical casings have also not proved suitable since a great portion of some fly materials escapes. Next to the mentioned deficiencies the further substantial disadvantage of the plants used until now is the fact that there is no other way to destroy the cohesion forces of the processed material in them than to use an increased pressure of the expansion medium which has the above mentioned disadvantages.

The described disadvantages have been removed by the method and the equipment according to the invention which provides a method of processing solid, solute, dispersed, or semiplastic compounds and, above all, those difficult to expand with gas and/or liquid, in an expanded layer, in which the particles of the processed compounds are put in motion and processed by the combined action of the current of a gas and/or liquid medium and of agitation. The corresponding medium is fed into the processed compound at a speed advantageously equal to, or lower than, the velocity at which complete fluidization comes into being. The agitation is realized at a controllable velocity according to the kind of the processed compound, e.g. with a frequency of 10–200 revolutions per minute, and the whole system of freely moving particles is put, by mixing, in a rotary motion with horizontal or oblique axes of rotation.

The apparatus for practicing the method is made into the form of an upwardly widening or vertical casing, the upper working space of which is separated by a fluidization grate, preferably a perforated lattice, from the lower portion into which the working medium is supplied, the latter portion being fitted with chambers serving for feeding media of equal or different properties. The working space is provided with inlets for feeding in the compounds to be processed and outlets for removing the finished product and working media. The fluidization grate, preferably a perforated lattice, separating the working space from the lower portion, is curved, preferably in the shape of a horizontally or obliquely situated cylindrical sector, totally or partially perforated. Above the fluidization grate, the agitation system is mounted, this system having 1–5 horizontal or oblique adjustably rotating shafts provided with blades, reaching, if need be, precisely as far as the fluidization grate while the outlets for withdrawing the working media and/or for supplying the compounds to be processed are arranged on the side walls of the upper portion of the casing.

The advantage of the method and the apparatus according to the invention lies mainly in the fact that the cohesion forces of non-expandable materials bonding their particles become destroyed and in this way the flow of the expansion medium is allowed to create, at suitable speeds, a homogenous expanded layer with a sufficient free motion of the particles of the processed compound. Also the geometry of the lattice (grate) contributes to this aim since it has an agitating effect itself. In this way it is possible to extend the palette of materials, workable by the technology of expanded layer, which is, in a lot of cases, the only suitable means to attain the resulting properties of the product, as it is, e.g., the dehydration of liquid vaccines on the solid particles of a compound of the same type, or on an accessory carrier and analogous material, where a high biological activity is required in the final product, and/or within the processing of compounds of a semiplastic consistency with which it is not possible to attain a fluidized layer with the use of the methods and devices hitherto employed.

Another advantage of the application of the method and the apparatus according to this invention is the increase of the process economy and the increase of the yield.

Examples of a possible practical realization of the method according to the invention are given generally on the one hand and interpreted by giving an account of processing some concrete types of materials on the other hand. One example of the practical use of the apparatus according to the invention is represented schematically in the attached figures.

Figure 1:
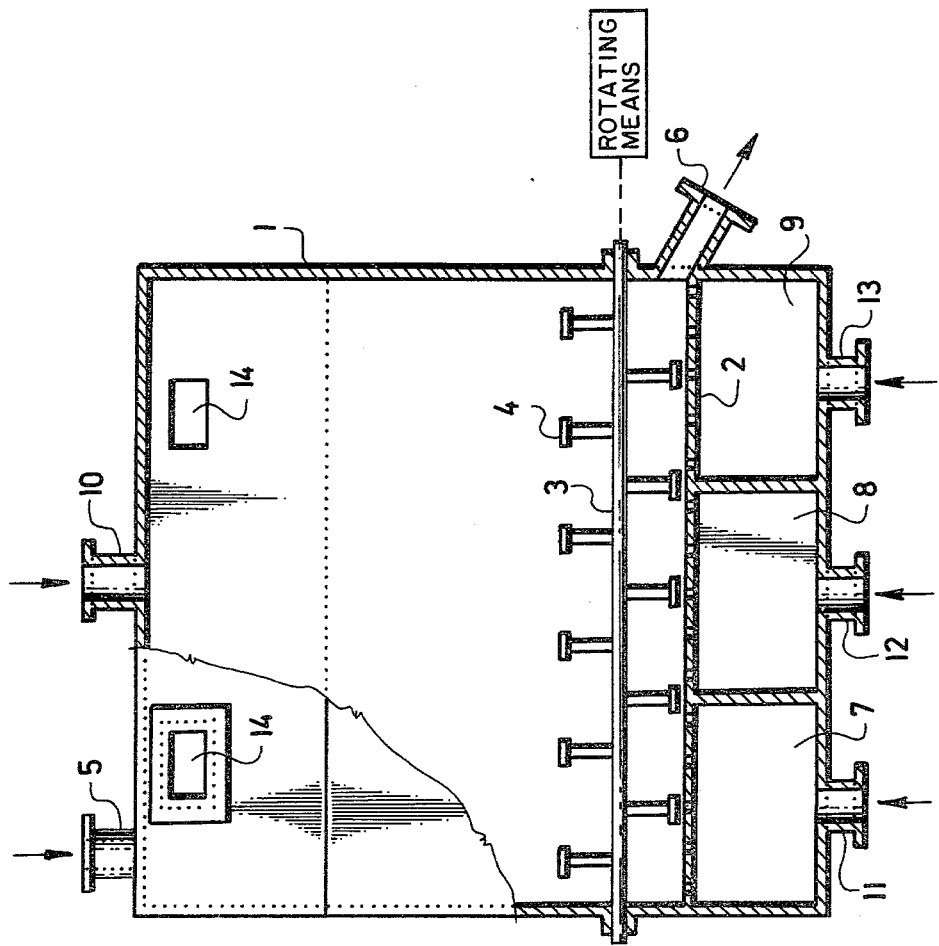

FIG. 1 represents the front view, partly in section, of the apparatus, FIG. 2 its side view, partly in section.

Referring to the drawings, the apparatus comprises casing 1 which is divided into an upper, or working, zone and a lower, fluid intake, zone by lattice 2. As will be seen from FIG. 2, the casing 1 is wider at the top than at the bottom, the side walls diverging for at least a part of the distance. A shaft 3 is journalled in the end walls for rotation and carries a plurality of agitators 4. Product inlets 5 and 10 are provided at the top and one or more fluid inlets 11, 12, and 13 are provided at the bottom.

Outlets 14 are at the top portion to draw off used expansion and working media and fly material. Product outlet 6 is at the bottom of the working chamber.

In principle, within the realization of this inventive method, gas or liquid, and/or a mixture of gas and liquid, is forced in into the layer of the processed compound on lattice 2 through holes in the lattice, the gas or the liquid, and/or their mixture being fed into the lower portion of casing 1. At the same time, agitator 4 is agitating the layer of the processed compound with an intensity which is sufficient to cause the particles of the processed compound to be released by a combined action of the agitator and the expansion of the layer, raised by gas, liquid, or their mixture, to such an extent that each of the particles performs free motion in the particle system, which is moving from the inlet 5 or 10 into the apparatus to its outlet 6, by the action of the blades 4. If it is required, for the perfect releasing of particles, the expanded system of the processed compound may be set into a rotary motion with a horizontal axis of rotation by means of a suitable selection of the speed of rotation and the agitator design.

The speed of flow of the expansion medium should be chosen according to the character of the compound to be processed; in order to prevent an unacceptable material fly-off the velocity may be even lower than the corresponding fluidization threshold.

If the compound to be processed is a liquid it may be dosed in various ways, e.g. in the form of a mist scattered from the upper part of casing 1, from the side walls, and/or directly into the layer of solid particles. In this case, the working of solutions and suspensions is considered above all on the basis of the solid phase of the same compound and/or an auxiliary carrier.

If it is required by the given technology the initial material may be processed gradually with a medium of different physical or chemical properties; in this way it proceeds through the apparatus, e.g., when solid material A should be treated with liquid material B. In this process an apparatus is used whose lower portion is fitted with chambers 7, 8, and 9 serving for the separate supplies of the expansion and working media.

Via chamber 7 air of a higher temperature (e.g. 150° C.) enters and preheats the solid particles of material A on to which melted material B is fed, e.g. through inlet 10 in the upper portion of the equipment.

Chamber 8 serves for supplying air of temperature of 80° C., which is the optimum processing temperature.

Before being discharged the treated product should be cooled down by air 20° C. which is entering through chamber 9.

The expansion and working media, after they have passed through the layer of the processed compound, and also the reaction products together with the fly material, are carried away through outlets 14 out of the equipment, and then, behind the equipment they are freed from fly materials in cyclones and/or filters. Before being discharged from the equipment the expanded layer should be killed with advantage in most cases.

A concrete example of realizing the method according to the invention may be represented by this technology.

EXAMPLE 1

The Conversion of Poultry Waste into a Protein Fodder

In the giant fattening stations with the capacity of 250,000 to 500,000 bred pieces the waste is wasted in an amount of several tens of metric tons a day. With respect to the ineffectively working digestive tract of poultry, these wastes represent high-quality components of protein fodder suitable above all for black cattle. The raw material in the form of a suspension containing 85–92% water is pumped into the apparatus in the working space of which the expanded layer of the product with a moisture content of 30–40% is rotating. The entry temperature of the air is 400°–600° C. at a linear velocity of about 1 m/sec. at which fluidization comes into being. The agitator rotates at a frequency of 80–120 rpm. The resulting product is brown particles of oblong shape, comparable with cut tobacco, deprived of mercaptanic and other components, deodorized, with a water content lower than 10%, and with caloric value equal to that of grain.

EXAMPLE 2

Dehydration of Chlorinated Rubber

The raw material is a white, very light, coarse-grained mass which, after being squeezed in the hand, is little cohesive, with a water content more than 75%. It tends to forming extraordinary channels and it is a mass in which the difference between the threshold velocity and the speed of the particle fly-off is very small. The air temperature is 150° C. under the grate, the linear velocity of the air below 0.2 m/sec. and a frequency of rotation of 30 rpm. The temperature of the processed product at the exit is 65°–70° C., the outlet moisture below 0.3%.

EXAMPLE 3

Dehydration of Bentonites

These products pertain to the group of hydrated aluminum silicates. The processed samples represented a non-homogeneous material of different sizes of particles, from 0.1 to 20 mm. The formation was enriched with the required quantity of $Na^+$ ions. The samples to be processed were untreated, mechanically pretreated, and shaped into a form of paste and suspension. The entry moisture content of the product was 40–80%. The temperature of the product was not allowed to go over 90° C. The dehydration was realized with the air at 200° C., the temperature of the product in the equipment was 65° C. at most, the linear velocity of the air about 1 $m/s^{-1}$, the frequency of rotation 60 rpm. The product moisture contents were below 10% within the requirements of the processing.

EXAMPLE 4

Dehydration of Vaccines Based on the Solid Matter of Vaccines and/or an Artificial Carrier The vaccines were processed successfully under these working conditions:

The temperature of gas under the grate was 60°–70° C., the linear velocity of gas was 0.2–0.28 m/sec., the temperature of the product in the final phases below 38° C., the residence time 25–40 minutes, the frequency of rotation 120 rpm.

The equipment according to the invention conforms with FIG. 1 and FIG. 2. It consists of casing 1 widening upwards. In the narrowed portion casing 1 is divided by means of a curved perforated lattice (or other type of a curved grate) 2 into the upper working space and the lower portion serving for the supply of expansion and working media. This lower portion may be divided into separate chambers 7, 8, and 9, arranged along the whole length of the equipment and serving to the independent supplies of the media of different properties. Immediately above lattice 2 the agitating system, consisting of rotary shaft 3 and a row of blades 4 fixed to it, is arranged. Shaft 3 passes the front walls of casing 1 and is provided with a drive having adjustable speed of rotation. In the cover of casing 1 inlets 5, 10 for feeding the compounds to be processed are mounted, the side walls of the upper portion of casing 1 held outlets 14 for carrying away the expansion and working media which have passed through the processed compound and/or the products of reaction. Outlet 6 for discharging the finished product is mounted on the rear end wall of the casing, the lower portion of the casing, and/or its individual chambers 7, 8, and 9, are provided with inlets 11, 12, and 13, serving for the supply of the expansion and working media. Outlets 14 may be connected with cyclones or filters. Casing 1 must be widened in its upper portion to such an extent that the surface of its cover is three to five times larger than the surface of lattice 2.

If need be, the agitating system may be composed of several shafts with blades arranged next to each other in the direction of the elongated axis of casing 1. Blades 4 may be provided with elastic scraping adapters.

Lattice 2 may be in the form of a cylindrical sector. The part of lattice 2 on the outlet side of the finished product may be without any perforation, which creates a chilling zone.

Inlets 5, 10 for feeding the compounds to be process may be located also on the side walls of casing 1, and/or they may have intakes right in lattice 2 (not shown).

Within the process the equipment is working so that the compound to be processed is brought in through inlet 5 and/or, if several compounds are to be processed, through inlet 10 or through other inlets in the side wall of casing 1, and/or in lattice 2, while, at the same time, the expansion and working media are forced into the rising layer of solid particles from the lower portion of casing 1. Owing to the action of agitator 4 the layer of the solid compound gets homogeneous and/or separated. Under the effect of the agitator the whole expanded system of freely moving particles advances in the direction of the outlet of the equipment. The advancing speed should be selected according to the required residence time for the given type of processing and the material.

In the course of their advancing through the equipment the freely moving particles may be exposed to unequal kinds of processing in individual sections defined by the width of chambers 7, 8, and 9.

The stream of the expansion and working media passing through the layer of the processed compound advances into the widened portion of casing 1 where it loses its speed and for this reason most of the contingently entrained parts of the processed compound fall back into the layer. Then the media leaves, together with the finest material fly-off, through outlets 14 from the equipment into the cyclone separators and/or filters.

The method and the equipment according to this invention are applicable in pharmaceutical and foodstuff industries, in fertilizer making process, in cement making, in plastic industry, and the like.

What is claimed is:

1. Fluidized bed apparatus for processing a first material to an end product, comprising:
   a casing having a relatively narrow lower portion communicating with a relatively wide upper portion;
   a curved elongated trough-like perforated lattice fluidization grate dividing said lower portion of said casing into an upper working space and a lower section comprising at least first, second and third fluid inlet chambers longitudinally disposed seriatim adjacent said grate;
   an elongated rotatable agitating and material advancing member disposed within said upper working space and having a shaft rotatably mounted to opposite end walls of said casing, and a plurality of radially extending agitation blades secured to said shaft;

a first product inlet adjacent the top of said casing for receiving said first material to be processed;

outlet means for spent media adjacent the top of said casing;

an end product outlet disposed at one end of said upper working space adjacent said third fluid inlet chamber and communicating with said upper working space;

means for rotating said agitating member to agitate said first material and to advance said first material toward said end product outlet at a predetermined speed;

means for introducing a first fluid at a first pressure, temperature and flow rate into said first fluid inlet chamber, to subject said material to a first processing condition;

means for introducing a second fluid at a second pressure, temperature and flow rate into said second fluid inlet chamber, to subject said material to a second processing condition;

means for introducing a third fluid at a third pressure, temperature and flow rate into said third fluid inlet chamber, to subject said material to a third processing condition.

2. The apparatus according to claim 1, further comprising a second product inlet adjacent the top of said casing for receiving a second material to be combined with said first material.

3. The apparatus according to claim 1 or 2, wherein said third temperature is sufficiently low to cool said end product prior to emergence thereof from said end product outlet.

4. The apparatus according to claim 1 or 2, wherein said first fluid is at a relatively high preheating temperature, said second fluid is at a lower processing temperature and said third fluid is at a still lower cooling temperature.

* * * * *